United States Patent [19]
Curran

[11] 4,054,477
[45] Oct. 18, 1977

[54] METHOD FOR FORMING A CONTOURED INSULATED HONEYCOMB CORE PANEL AND PANEL PRODUCED

[75] Inventor: Richard Norman Curran, Auburn, Wash.

[73] Assignee: The Boeing Company, Seattle, Wash.

[21] Appl. No.: 629,864

[22] Filed: Nov. 7, 1975

[51] Int. Cl.² ............................................. B31D 3/02
[52] U.S. Cl. .................................... 156/197; 29/423; 29/424; 156/212; 156/221; 428/117
[58] Field of Search .............. 156/196, 197, 212, 221, 156/222, 224, 323; 428/73, 116, 117; 29/423, 424; 350/293, 296; 343/912

[56] References Cited

U.S. PATENT DOCUMENTS

| | | | |
|---|---|---|---|
| 2,512,875 | 6/1950 | Reynolds | 219/345 |
| 2,556,470 | 12/1951 | DelMar | 156/197 X |
| 2,608,500 | 8/1952 | DelMar et al. | 428/117 X |
| 2,742,387 | 4/1956 | Giuliani | 156/224 |
| 2,744,042 | 5/1956 | Pace | 428/117 |
| 2,910,396 | 11/1952 | Randall et al. | 156/197 |
| 2,951,004 | 8/1960 | Martin et al. | 428/116 |
| 2,952,579 | 9/1960 | Merriman | 156/197 X |
| 2,978,806 | 4/1961 | Herbert, Jr. | 156/197 |
| 3,150,793 | 9/1964 | Messer | 220/9 |
| 3,160,549 | 12/1960 | Caldwell et al. | 428/117 |
| 3,235,441 | 11/1956 | George et al. | 428/117 X |
| 3,317,074 | 5/1967 | Barker et al. | 220/9 |
| 3,373,074 | 3/1968 | D'Eustachio et al. | 156/71 X |
| 3,478,553 | 11/1969 | Weglarz | 156/221 |
| 3,492,196 | 1/1970 | Moore | 156/71 |
| 3,640,798 | 2/1972 | Deeds | 428/117 |
| 3,658,974 | 4/1972 | Low | 156/196 |
| 3,703,422 | 11/1972 | Yoshino | 156/87 |
| 3,976,526 | 8/1976 | Hovey et al. | 156/212 |

Primary Examiner—David A. Simmons
Attorney, Agent, or Firm—Christensen, O'Connor, Garrison & Havelka

[57] ABSTRACT

A lightweight metallic honeycomb core panel structure having a high strength, a highly contoured surface and possessing relatively low thermal conductivity through the panel is prepared by bonding a first adhesive sheet and a peel-ply cloth to one edge surface of a honeycomb core prior to contouring the core into the desired shape with the first sheet applied to the surface which becomes the convex side of the panel. Sufficient force is applied to the sheet in order to force the edge of the honeycomb core through the uncured adhesive and the sheet is bonded to the core forming a structural fillet. The core is then contoured to the desired shape with the peel-ply acting to prevent spreading of node bonds at the convex surface. A second sheet also comprising an uncured adhesive material and a peel ply cloth is bonded onto the second side of the core so that a fillet is formed on the core cell walls. The peel-ply cloths are then removed to expose a bondable surface. A layer of uncured adhesive sheet material is then applied to each surface of the core, and metallic face sheets applied thereon. The adhesive sheet is cured forming a honeycomb core panel having thermal insulation barrier between the core and face sheets provided by the second adhesive sheet.

4 Claims, 9 Drawing Figures

METHOD FOR FORMING A CONTOURED INSULATED HONEYCOMB CORE PANEL AND PANEL PRODUCED

BACKGROUND OF THE INVENTION

This invention relates to a method for preparing contoured honeycomb panels having good insulative and strength properties for use in thin wall construction such as aircraft and other vehicle doors and wall panels.

In the construction of aircraft bodies, refrigerated vehicles, cargo containers and the like it is frequently desirable to have a strong, lightweight, thin panel member which possesses a low thermal conductivity. In addition, for the aircraft manufacturing applications a thin contoured shape frequently is essential to fit the panel into its intended location. A thin panel structure is also necessary so that the door or other unit in which the panel is to be utilized occupies a minimum of otherwise usable space in the aircraft.

Heretofore such construction panels, as are described above, have been formed by utilizing a metal honeycomb core bounded by face sheets attached directly to the opposed end edges of the honeycomb cells. This configuration results in a high heat conductivity due to metal to metal contact at the face sheetcore interface. Insulation on the outside of the panel so formed has been found necessary to obtain the desired resistance to heat conduction necessary for aircraft usage. The resulting structure has a relatively thick cross-section due to the configuration necessary to obtain sufficient strength coupled with the thickness of the insulation material attached to the outer surfaces of the panel. In certain applications the thickness of the panel, for example, when used as a door in an aircraft has resulted in the loss of usable cargo or passenger space. Substitution of plastic or other insulative material for the metal core results in a composite having lower strength.

OBJECTS OF THIS INVENTION

It is a primary object of this invention to provide a lightweight construction panel having a low thermal conductivity.

It is a second object of this invention to provide a lightweight thin construction panel having improved strength characteristics and low thermal conductivity.

It is another object of this invention to provide a method of manufacturing honeycomb core construction panels having high strength and low thermal conductivity. It is a related object of this invention to provide a method of forming honeycomb core construction panels into a complex or severely contoured shape without separation of the honeycomb node bonds on the convex side of such a contoured shape and get a more nearly even forming of the cells producing an even, smooth surface free of buckled and out-of-contour areas.

Another object of this invention is to provide a thermal insulation between the core and the skin of a honeycomb structure by interposing a relatively non-heat conducting material such as a polymeric sheet between the core end edge and the metal face sheet covering the core edge surfaces. It is a related object of this invention to provide a manufacturing process which produces an adhesive film bond between the core and metal face sheet of a honeycomb structure in which the metal honeycomb core does not penetrate the adhesive sheet, with or without the use of a scrim.

Another object of this invention is to provide a method of manufacture for and the resulting panel structure for a thin wall construction application having a center metallic honeycomb core bonded to but thermally insulated from structural metallic face sheets such that the panel structure has a low coefficient of thermal conductivity but possesses high strength. It is a related object to provide a method of construction for and the resulting panel structure having a honeycomb core containing insulative material such as foam disposed within the honeycomb cells said honeycomb core being bonded to but thermally insulated from structural face sheets.

SUMMARY OF THE INVENTION

These objects may be advantageously achieved by forming a honeycomb core construction panel in the following manner. A honeycomb core element manufactured of, for example, aluminum sheet material adhered together at node bond locations in a manner well known in the art is cleaned and prepared for bonding. An adhesive sheet material with or without a scrim and having a peel ply cloth backing of sufficient strength to prevent substantial stretching of the adhesive material is applied to one surface of the core and bonded by heat and pressure to form a fillet on the core cell walls. The core is then shaped into the desired contour as by passing through the nips of forming rolls or the like with the bonded adhesive and the peel ply located on the resultant convex surface of the core being formed. The complex backing sheets usually required and the deformation and destructive defects frequently found in the contouring of honeycomb core material is alleviated by the presence of the adhesive sheet material and the relatively nonstretchable peel ply which keeps the cell end edge structurally intact. Thus in order to deform the honeycomb core to the desired shape the concave surface of the honeycomb core will, by necessity, be compressed rather than the usual stretching and distortion encountered on the convex surface in forming honeycomb core to the contour desired. A second layer of adhesive material with peel ply attached is then placed on the concave cell end edge surface and bonded to form fillets on the cell walls.

The second adhesive material is then bonded by heat and pressure, forming a fillet on the honeycomb cell walls adjacent the edge of the core. The peel plies are then removed and another layer of uncured adhesive applied to each side of the core in contact with the cured adhesive previously bonded on the core. Metal face sheets are then applied over the uncured adhesive, the structure is compressed with a pressure insufficient to cause penetration of the second adhesive sheets by the core and the adhesive is cured, thus bonding the face sheets to the contoured core without thermal or electrical contact between the face sheets and the core.

The presence of the cured adhesive sheet across the core face acts as a spacer to prevent contact between the end edge surface of the honeycomb core and the face sheet thus thermally isolating the elements of the honeycomb panel and interrupting the conduction path for heat normally associated with honeycomb panels.

The first layer of adhesive provides an excellent bonding surface for the second adhesive layer and prevents the cell walls from penetrating the second layer. In addition, the first layer of adhesive forms into a fillet having improved adherence characteristics to the honeycomb cell walls, thereby enhancing the strength of the overall honeycomb panel structure. If desired, an elastomeric foam or other insulating foam substance may be placed into the cells of the honeycomb core for added insulation to the transfer of heat.

These and other advantages will be more particularly brought out upon reference to the accompanying drawings, detailed specification and claims appended to the specification.

DESCRIPTION OF THE PREFERRED EMBODIMENT

Figure 1:
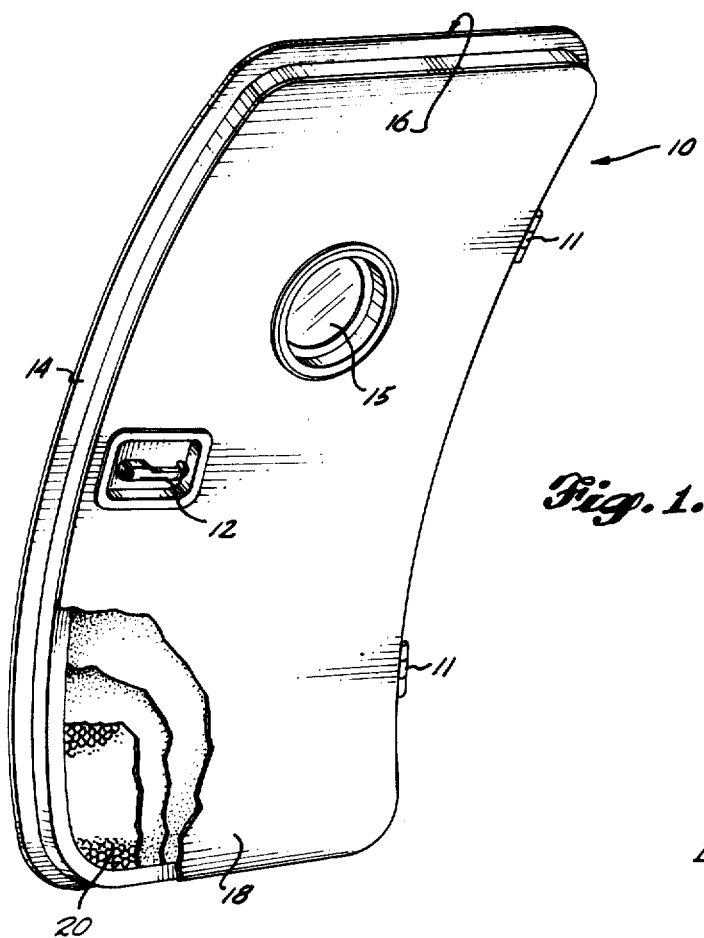
FIG. 1 is an isometric view of a thin aircraft access door panel constructed using a honeycomb core produced through the process described by this invention.

Referring specifically to the drawings, wherein like numerals indicate like parts, FIG. 1 illustrates a curved aircraft access door 10 which is unique among comparable aircraft access door panels in that it is considerably thinner than those presently in use, yet it retains the thermal-insulative qualities of the thicker doors as well as providing sufficient strength for the intended purpose. Further enhancement of the insulative qualities of the honeycomb structure is achieved through the use of an insulative filler within the core 12. Suitable materials include foamed-in-place elastomers or their equivalent. The considerably thinner door panel is particularly useful in areas where space is limited; for example, where there is no room for internal swing of the door. A door produced in the manner described by this invention may be constructed to slide between the aircraft outer skin and interior trim paneling; that is, within the cabin wall, yet be of a quality and nature which would not degrade the thermal-insulative integrity of the cabin structure. The fuselage paneling, including both inner wall and outer airplane skin, may also be manufactured according to this invention.

This invention describes a unique, economically feasible process for producing honeycomb paneling such as is employed in the manufacture of the previously described aircraft access door 10. This paneling finds use in all types of thermal-insulative applications, for example, in refrigerated vans and trailers, sealed cargo containers and in secondary structures such as in ships to control sweating on surfaces below decks in high humidity areas.

The door 10 in FIG. 1 is comprised of a peripheral structural frame 14, housing hinge 11, latching means 12, window 15, inner skin 18 and outer skin 16 which forms a part of the outer skin of the aircraft whenever the door is closed. The core 13 of the door is a metallic honeycomb, preferably foam filled to provide enhanced thermal insulation. The inner facing panel 18, adhesively attached to the honeycomb core 20 by the process described below, is adhesively bonded to the frame 14. The inner facing panel 18 provides for the attachment of decorative trim material and for housing latching means 12 and window 15.

Figure 2:
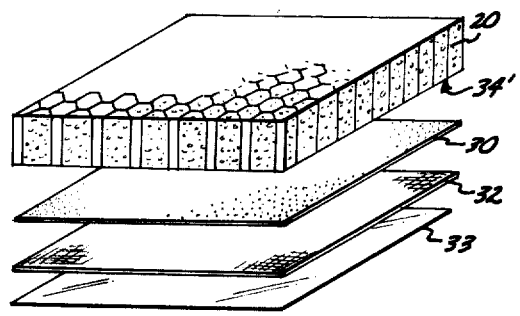
FIG. 2 illustrates the elements of the first core stabilizing layer as they are applied to the panel in the second step of the process.
Figure 3:
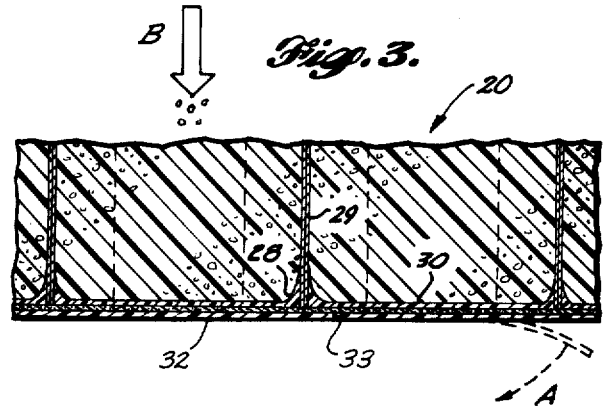
FIG. 3 illustrates the panel in cross-section after application of the first stabilizing layer and curing of the first adhesive sheet.

FIGS. 2 and 3 show the bonding of a thin layer of tape or sheet adhesive 30, a layer of nylon peel ply 32 and a release film 33 to the face 34 of the honeycomb core 20. The adhesive 30 which is carried by the layer of nylon peel-ply 32 and release film 33 is forced into contact with the exposed edge 34 of the honeycomb core to the extent the honeycomb core becomes embedded into the adhesive layer 30 and contacts the surface of the nylon peel-ply 32. The adhesive is then cured such as by subjecting it to an elevated temperature whereby fillets are formed on the cell walls of the honeycomb core to provide good adhesion and bonding. The adhesive may also fill the open spaces of the peel ply to provide a seal. In FIG. 3 the layer of peel-ply 32 and release film 33 are shown in contact with the end of core cell walls 29 with the fillets 28 shown formed thereon. Arrows A demonstrate removal of the peel ply 32 and release film 33 leaving the filleted and cured adhesive on the core in an exposed condition ready for bonding to another adhesive layer.

Prior to removal of the peel-ply 32 and release film 33 from the structure, a suitable insulative material may be injected into the honeycomb core from the open side thereof as generally demonstrated in FIG. 3 by Arrow B. Any suitable insulative material, preferably a foamed-in-place elastomer may be utilized.

Figure 4:
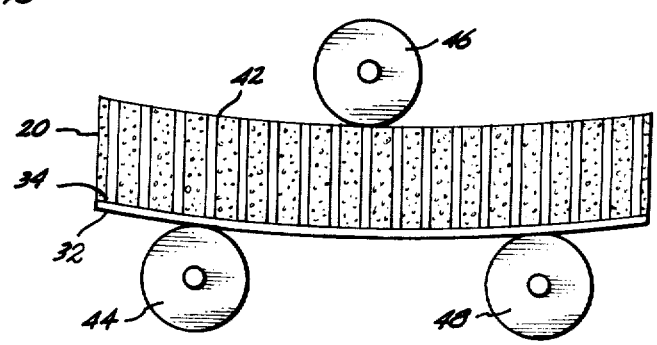
FIG. 4 is a schematic representation of the rolling or contouring of the panel with the stabilizing layer positioned on the resultant convex surface.

The peel-ply 32 acts as a carrier and stabilizer for the delicate honeycomb core to prevent damage to the node bonds of the core as it is subjected to distortion in forming the contoured shape necessary. The presence of the peel-ply fabric 32 lends dimensional stability to the cell end edge surface 34 onto which it is adhered preventing stretching or other deleterious effects otherwise encountered in the contouring process. In FIG. 4, one form of a contouring process is shown in which core 20, having the peel-ply 32 adhered thereto, is formed into a contoured shape with the peel-ply 32 being applied to the resultant convex surface of the core 20. This is necessary in order to prevent the cell end edge from spreading and destroying node bonds of the honeycomb structure. The first adhesive layer acts to hold the peel-ply in place during contouring and also comprises the basic attaching fillet on the cell edges for lamination of subsequent adhesive films and metal facing sheets. It should be noted that in conventional honeycomb panel fabrication, adhesive bonding relies on adherence directly between the core edge and the face sheet. Whenever the honeycomb panels produced as described herein further contain an insulative material within the cells conventional filleting of the second adhesive layer may be somewhat impeded. An adequate adhesive bond to core 20 may be obtained through the combined adhesion to the metal cell wall edges 29 and the exposed faces of the insulation material in the cells. Alternatively, an adhesive substance may be placed on the cell end edges of the honeycomb structure by reticulation prior to placing the foam into the interior of the cells. The adhesive may also be emplaced by dipping the cell end edge surface into a shallow pan containing adhesive material, by brushing, rolling, or other means well-known in the art for applying adhesive materials to honeycomb cell structures. Since the cell wall edges 29 do not cut into and through the second adhesive film in this process and thereby form a metal-to-metal contact with the face sheet, a unique thermal isolation of the elements of the honeycomb structure results. The second layer of adhesive does not need to contain a scrim or other insulative material therein to prevent direct contact of the metal elements of the honeycomb structure and thereby insulate the metallic core from the metallic facing panels. The usual path for conduction of heat is interrupted preventing the conduction of heat through the metallic elements of the panel.

As shown in FIGS. 2 and 3, the first adhesive film 30 is applied in conjunction with a composite layer of nylon peel ply 32 and a release film 33. The peel ply is normally a composite sheet of a coarse, square-woven fabric impregnated with adhesive. The release film serves to produce a smooth impervious surface to keep out contaminants protecting the adhesive through machining and forming processes prior to bonding additional laminations thereon. The release film 33 is removed after bonding but before contouring of the core.

FIG. 4 illustrates the process step in which the panel 20 is rolled to the desired contour. In the rolling process, the outside convex surface 34 is under tension while the inside concave surface 42 is in compression, tending to deform the panel. Since tensile forces tend to destroy internal cell node bonds at the convex surface 34 and thereby subsequently degrade the structural integrity of the honeycomb core, the rolling process is accomplished in an inventive manner which controls the tensions in the convex outer surface and accepts a controlled compression deformation on the inner concave surface. Note that the stabilized layer of adhesive 30 and peel ply 32 applied in the previous process step is on the outside convex surface of the panel. The stabilized layer prevents tension deformation of the convex surface during the rolling of the panel. The apparatus shown schematically in FIG. 4 is commonly termed a pyramid rolling system and, through adjustment of the relative positioning of the three rolls 44, 46, and 48, the magnitude or radius of panel contour can be adjusted. During this type of rolling, an unsupported panel may buckle beneath the middle or upper roll 46 if unsupported by a carrier on the underside of the core. The peel ply 32 performs the carrier function for many configurations and stabilizes the outer convex surface preventing destructive tension-related distortions. The stabilized layer allows the panel to undergo substantial contouring in the rolling process without destruction. Under extreme contouring conditions it may be necessary to provide additional carrier means for support.

Figure 5:
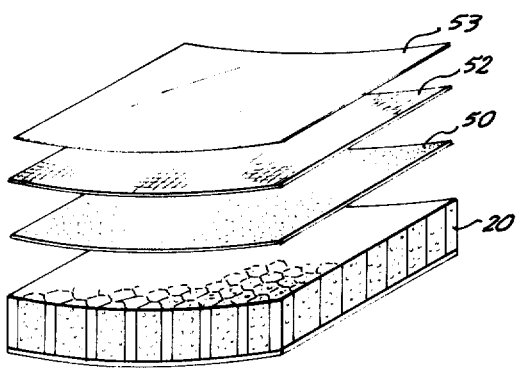
FIG. 5 illustrates the application of another core adhesive layer and peel ply sheet to the concave surface of the contoured panel.
Figure 6:
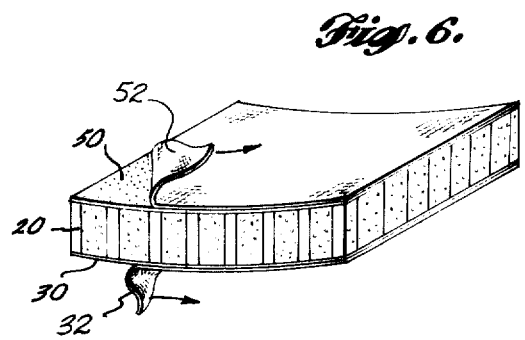
FIG. 6 illustrates the fifth step in which the protective peel ply sheets are removed from the cured adhesive surface.

FIG. 5 illustrates the application of a second stabilizing layer to the inner concave surface of the contoured panel 20. This layer may be identical to that applied to the opposite face of the panel, and preferably is comprised of a layer of adhesive 50, a layer of nylon peel ply 52 and a release film 53. This layer is applied pressed so that the core penetrates the adhesive. The adhesive is then cured forming fillets and the core is ready for application of the remaining laminations to complete the panel. In preparation therefor, as shown in FIG. 6, the peel plies 32 and 52 are removed from each face of the core panel 20 revealing the adhesive surfaces 30 and 50 beneath.

Figure 7A:
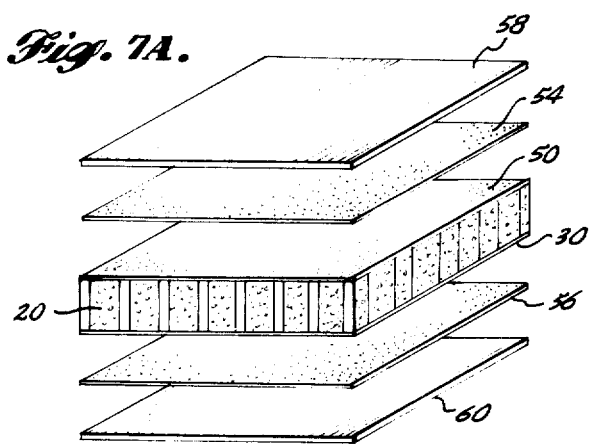
FIGS. 7A and 7B illustrate first in exploded isometric, and then, in assembled cross-section, the sixth and final process step in which a second adhesive sheet is applied to each side of the core and the metal panel facing sheets are applied to the exposed adhesive surfaces.
Figure 7C:
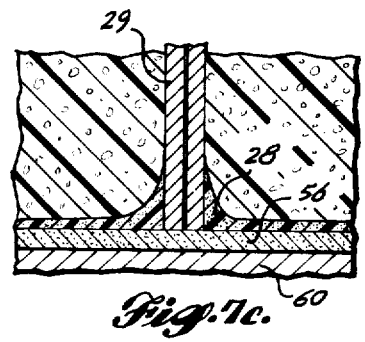
Figure 7B:
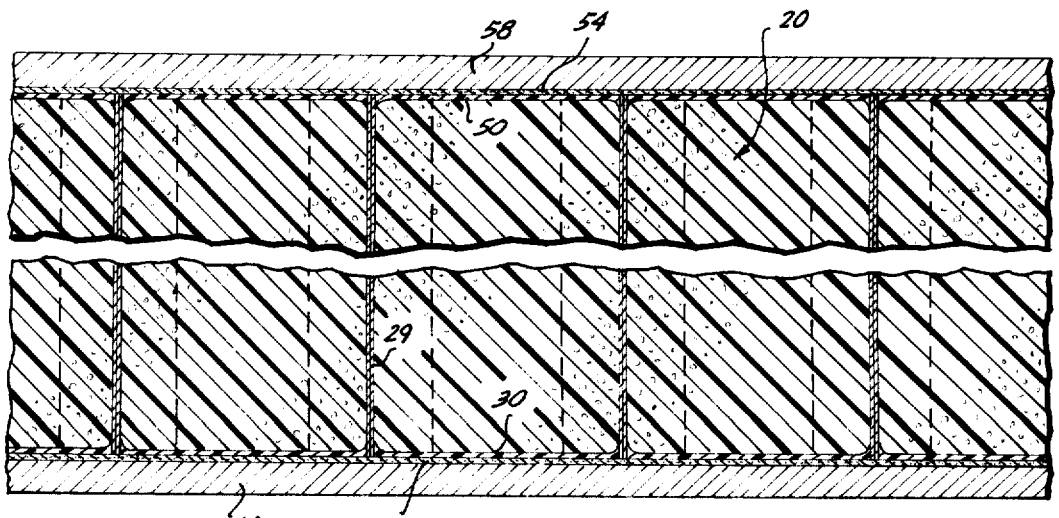

FIGS. 7a and 7b illustrate first in an exploded isometric, and then in cross-section, respectively, all of the laminating elements which form the completed panel. The core 20 with adhesive film layers 30 and 50 bonded to both faces is sandwiched between two additional layers of adhesive 54 and 56 and finally the metal facing sheets 58 and 60. The elements are pressed together and cured, bonding the facing sheets to the core. Note that there is no contact between the metallic honeycomb or the metallic facing sheets, the adhesive layer 54, and 56 forming an efficient insulation. FIG. 7b shows an enlarged cross-sectional view of the completed honeycomb core assembly. Again face sheets 58 and 60 have adhesive layers 54 and 56 respectively adhered thereto. These adhesive layers form an insulative barrier between the end edges of the honeycomb core and the face sheets. Fillets of adhesive material are shown extending into the cell of the honeycombs, the fillets being formed by the emplacement and curing of inadhesive film 30 and 50.

In FIG. 7c a very greatly enlarged view of the fillet structure and the honeycomb composite is shown. The fillet 28 provides substantial strength to the joint by its extensive contact with the surfaces of aluminum core materials 20. In this view it is clearly shown that the adhesive layer 56 adhered to the aluminum face sheet 60 is not penetrated by the honeycomb cell structure 20 so that the desired thermal insulation is obtained. Fillet 28 adhered to cell wall 29 provides a strong bond between the core and face sheet 60.

While the inventor has described this invention with respect to a preferred embodiment thereof, many variations and changes within the scope and spirit of this invention will become apparent to one skilled in the art based upon the teachings herein. For example, a plurality of layers of adhesive material may be utilized in order to further insulate the metal facing sheet from the honeycomb core. In the event that insulative foam is utilized in the interior of the honeycomb cells, an adhesive layer may be utilized which is compatible with the foam placed in the cells thus providing an additional surface for adhesion between the facing sheets and core materials. A scrim in the adhesive may be used or the adhesive may be reticulated on the core before the foam is inserted.

I claim:

1. A process for preparing an insulated contoured honeycomb core structure having minimized distortion at the convex surface thereof comprising:
    bonding a stabilizing adhesive layer including a relatively nonstretchable dimensionally stable peel ply on one cell end edge surface of a honeycomb core;
    shaping said honeycomb core with said adhesive layer positioned on the resultant convex surface of said core wherby cell and edge structure remains undistorted on said convex side and cell end edge structure on the concave side is compressed;
    bonding a second adhesive layer on said concave side; removing said peel ply; and
    and adhering a face sheet to each side of said honeycomb core without piercing of said stabilizing adhesive layer by said core whereby said stabilizing layer thermally isolates said face sheet from said honeycomb core to minimize the heat conductivity of said honeycomb core sandwich.

2. The process of claim 1 and inserting insulative foam into the cells of said honeycomb core prior to application of said second adhesive layer.

3. A method of preparing a contoured, insulated honeycomb core structure comprising the steps of:

pressing a first adhesive layer carried by a first relatively nonstretchable dimensionally stable peel ply into a first side of an aluminum honeycomb core;

curing said adhesive to form fillets of adhesive on the interior surfaces of said honeycomb core adjacent edges thereof;

contouring said honeycomb core to the desired configuration, said honeycomb core being positioned during said contouring so that said first side is convex, said dimensionally stable peel ply preventing expansion of core cells at said first side;

aplying a second adhesive layer carried by a second peel ply to the other side of said honeycomb core;

curing said second adhesive layer;

removing said firt and said secod peel ply;

adhering face sheets to each side of said honeycomb core, said face sheets being isolated from said honeycomb core by an adhesive layer not penetrated by said honeycomb core whereby heat conductivity of said honeycomb core panel is minimized.

4. The process of claim 3 wherein said first adhesive layer is forced against said core whereby said core penetrates said first adhesive layer.

* * * * *